United States Patent [19]

Shaw et al.

[11] Patent Number: 4,860,318

[45] Date of Patent: Aug. 22, 1989

[54] PSK DETECTION USING AN IFM RECEIVER

[75] Inventors: Rudy L. Shaw, Huber Heights; James B. Y. Tsui, Centerville; James N. Hedge, Jr., Medway, all of Ohio

[73] Assignee: The United States of America as represented by the Secretary of the Air Force, Washington, D.C.

[21] Appl. No.: 215,662

[22] Filed: Jul. 6, 1988

[51] Int. Cl.[4] .............................................. H04L 27/22
[52] U.S. Cl. ..................................... 375/82; 375/106
[58] Field of Search ..................... 375/82, 83, 96, 104, 375/106; 328/129.1; 329/126, 128, 130.1; 377/107; 455/226, 145, 161; 342/195, 202

[56] References Cited

U.S. PATENT DOCUMENTS

3,999,136 12/1976 O'Berry et al. ..................... 377/107
4,379,993 4/1983 Holden ............................. 328/129.1
4,551,846 11/1985 Takeda et al. ........................ 375/82
4,558,284 12/1985 Zaidenweber ...................... 329/126

Primary Examiner—Benedict V. Safourek
Attorney, Agent, or Firm—B. E. Franz; Donald J. Singer

[57] ABSTRACT

The apparatus detects the presence of long or short pulse phase shift keyed (PSK) modulated signals and determines the underlying clock frequency and modulation code associated with such signal, in real time, using an instantaneous frequency measurement (IFM) receiver as its signal source, without affecting the bandwidth or sensitivity of this receiver. It monitors the output of the IFM correlators for transients which occur in the correlator's outputs when a PSK signal is present. Logic circuits are used to declare the PSK signal is present, determine its clock rate, a record the modulation or total number of pulses.

5 Claims, 9 Drawing Sheets

PSK DETECTION USING AN IFM RECEIVER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the detection of the presence of phase shift keyed (PSK) modulated signals using an instantaneous frequency measurement (IFM) receiver, particularly in a radar warning system.

Phase shift keyed (PSK) transmissions consist of phase modulating a carrier frequency in some coded manner. This type of modulation is one of the primary types which generically are referred to as spread spectrum transmissions. Spread spectrum radio frequency (RF) transmissions are used in radars to increase detectability and enhance their electronic counter-counter measures (ECCM) capability. Without specific knowledge of the carrier frequency, clock rate, and modulating code, the PSK transmission is extremely difficult to detect, characterize, and counter. In many radar EW (electronic warfare) applications, the lack of specific information about the signal is the normal operating environment.

One method of detecting a potential radar PSK transmission is discussed in a technical report AFWAL-TR-84-1014 (S) by M. B. Szymanski and R. G. Wiley titled "Spread Spectrum Receiver," February 1984. This approach employs a rapid scan superheterodyne receiver with noncoherent processing gain to detect a long pulse signal with a low signal to noise ratio imbedded in a background of standard radar signals and noise. The primary limitation of this approach is that the PSK signal must be a long pulse signal.

Another method of detecting a PSK signal is described in U. S. Patent 4,597,107 to Ready et al. This approach, while apparently feasible requires a special receiver/processor be built specifically to accomplish this. The advantage to this approach however is also the reported capability to detect low signal to noise transmissions.

Other U. S. Patents of interest include No. 4,166,980 to Apostolos et al, which discloses recognition of several signal types including PSK from compressive receivers. No. 4,227,255 to Carrick et al discloses a signal classifier. No. 4,298,985 to Ballard et al shows a digital filter bank detector. No. 4,612,545 to Asendorf et al discloses an automatic frequency identifier for radar signals, using an IFM receiver and an Instantaneous Fourier Transform receiver.

SUMMARY OF THE INVENTION

An object of the invention is to provide for the detection of the presence of PSK signals, and determine the clock rate, using an instantaneous frequency measurement (IFM) receiver. A further objective is to maintain the present operational bandwidth and sensitivity of the IFM receiver and be able to accomplish the signal analysis in near real time on a long or short pulse PSK signal.

The apparatus according to the invention detects the presence of long or short pulse phase shift keyed (PSK) modulated signals and determines the underlying clock frequency associated with such signals, in real time, using an instantaneous frequency measurement (IFM) receiver as its signal source, without affecting the bandwidth or sensitivity of this receiver. It monitors the output of the IFM correlators for transients which occur in the correlator's outputs when a PSK signal is present. Logic circuits are used to declare the PSK signal is present, determine its clock rate, and record the modulation or total number of pulses. The clock rate contains important information for signal sorting, identification and application of jamming techniques.

DETAILED DESCRIPTION

I. INTRODUCTION:

An instantaneous frequency measurement (IFM) receiver is a radio frequency (RF) receiver used primarily in radar warning systems. Its basic function is to measure the frequency of radar signals. Some IFM receivers have the capability of measuring signal amplitude and for pulsed signals the pulse time of arrival and pulse width. The apparatus of the invention used the frequency measurement circuit of the IFM receiver to detect the presence and determine the clock rate of the phase shift keying (PSK) signals. The apparatus also extracts a near replica of the modulation code associated with such signals.

Spread spectrum RF transmission is used in new radar technology to increase detectability and enhance the electronic counter-counter measure (ECCM) capability of radar systems. The three common techniques of spectrum spreading are frequency hopping, frequency modulation (FM) also referred to as chirp, and phase shift keying (PSK). An IFM receiver can process frequency hopped signals as conventional pulsed signals without any major problem. It can also measure the frequency of a chirp signal and the chirp rate through multiple samplings. However, a pulsed PSK signal will go undetected as a PSK signal in the conventional IFM processing. The pulsed PSK signal will be interpreted as a conventional signal with a frequency output corresponding to either the unmodulated PSK carrier signal or a random frequency which will be discussed later. If the PSK signal is a long pulse signal it will not be discernible from a continuous wave signal. However, in any of the above cases, the phase transitions in the PSK signal result in spikes in the IFM frequency measurement circuit which can be detected with appropriate circuitry. The apparatus according to the invention exploits these spikes to detect the presence of PSK signals and to measure its underlying modulating clock rate. The clock rate contains important information for signal sorting, identification and application of jamming techniques.

Figure 1:
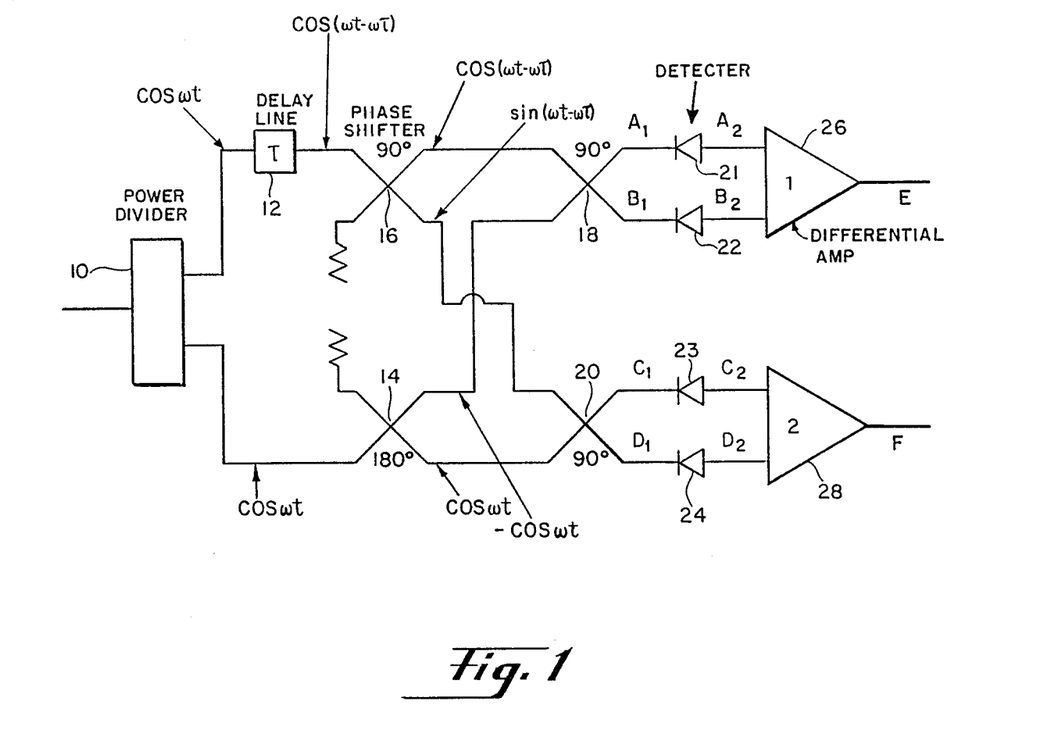
FIG. 1 is a block diagram showing an IFM correlator.
Figure 1A:
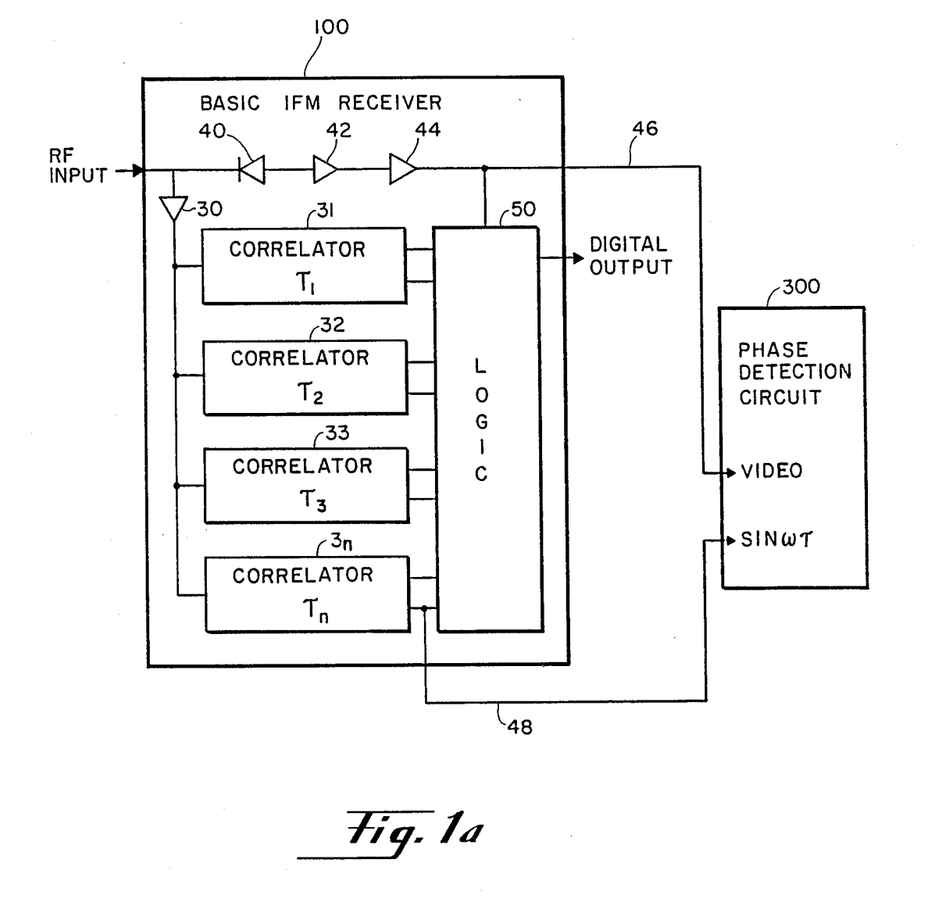
FIG. 1a is a block diagram showing a basic IFM receiver, and a phase detection circuit.

II. AFFECT OF PSK SIGNAL ON IFM RECEIVER:

The frequency measurement principle of an IFM receiver is well known. The schematic of an IFM correlator of a basic IFM receiver is shown in FIG. 1. It comprises a power divider 10, one delay line 12, one sum-difference hybrid 14, three quadrature hybrids 16, 18 & 20, four detectors 21-24, and two differential amplifiers 26 and 28. After the signal passes through the network, sin $\omega\tau$ and cos $\omega\tau$ are presented at the outputs of the differential amplifiers 26 and 28. By comparing sin $\omega\tau$ and cos $\omega\tau$, the frequency of the input signal can be determined. The comparison occurs only for a very short time period and only after the frequency measurement circuit reaches a stable state. In most receivers the measurement circuit is stable and sampling occurs 50 to 100 nanoseconds after signal detection. It should be noted that the circuit described above only describes the principle of the IFM receiver. A useful implementation of this principle involves multiple circuits of the type shown in FIG. 1 with different time delays, as shown in FIG. 1a.

Now consider the output of one of the differential amplifiers (sin $\omega\tau$), if the input is a PSK signal. Two kinds of outputs will be generated by the differential amplifier: sin $\omega\tau$ and $\sin(\omega\tau-\theta)$ where $\theta$ represents the amount of the phase in the input signal. This effect can be explained with the aid of FIG. 2, comprising graphs (a)-(d). Graph (a) shows the input signal where 0 represents no phase shift and 1 represents a phase shift of $\theta$. Graph (b) shows the input signal delayed by time $\tau$. Graph (c) shows the output of the differential amplifier as a function of time. During the time periods of duration $\tau$ shown crosshatched, the output is $\sin(\omega\tau-\theta)$, while the rest of the time the output is sin $\omega\tau$. If $\theta=180$ degrees (referred to as BPSK), which is the most popular case, the outputs will alternate between sin $\omega\tau$ to $-\sin \omega\tau$. Under this condition, the output is shown in graph (d). If the signal is not phase coded the output will be constant at sin $\omega\tau$. The output of the other differential amplifier or the cosine output is similar to the sine output. By detecting these narrow spikes the clock rate of the PSK signal can be determined. In general, the spikes can be either positive or negative depending on the frequency of the input signal.

Figure 2:
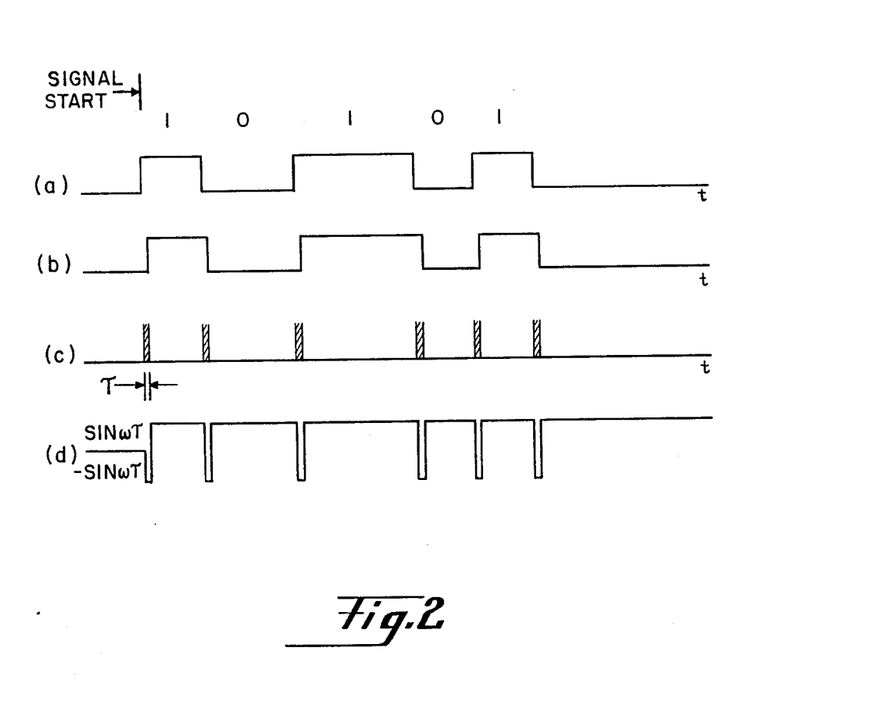
FIG. 2 is a set of graphs showing differential amplifier outputs for a correlator.

For a typical IFM receiver operating in the 2 to 4 GHz range, the clock frequency in FIG. 2 might be about 5 MHz for PSK signals, and the value of $\tau$ might be about 16 nanoseconds.

For the single stage IFM shown in FIG. 1, the frequency measurement made during the sampling window will result in the correct PSK carrier frequency. However, as was previously noted, a realistic IFM receiver will have multiple circuits of the type shown in FIG. 1 with different delay times, as shown in FIG. 1a. Because of the different delay times, it is possible for the frequency measurement to occur while a change of state is occurring. This would result in an erroneous frequency measurement.

Referring to the diagram of FIG. 1a, the basic IFM receiver 100 comprises N correlators 31-3n of the type shown in FIG. 1, e.g. a correlator 31 with delay $\tau_1$, a correlator 32 with delay $\tau_2$, a correlator 33 with delay $\tau_3$, etc. to a correlator 3n with delay $\tau_n$. The RF input is coupled via an amplifier 30 to the inputs of all of the correlators 31-3n. The two outputs of each correlator go to a logic circuit 50. The receiver 100 also has a video section comprising a detector 40, an amplifier 42, and a comparator 44 providing a video output to the logic circuit 50, and shown also on line 46.

Figure 3:
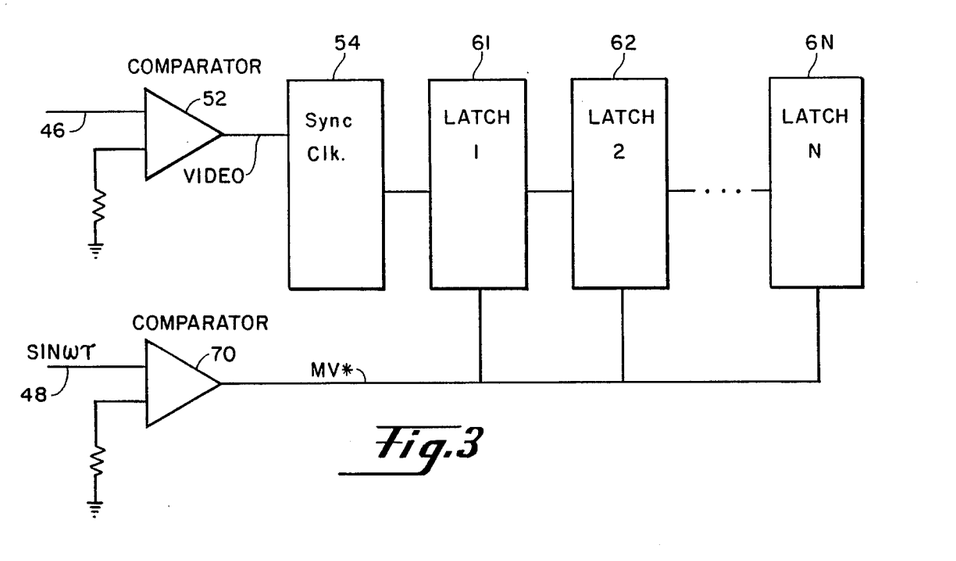
FIG. 3 is a block diagram of a phase detection circuit.
Figure 4:
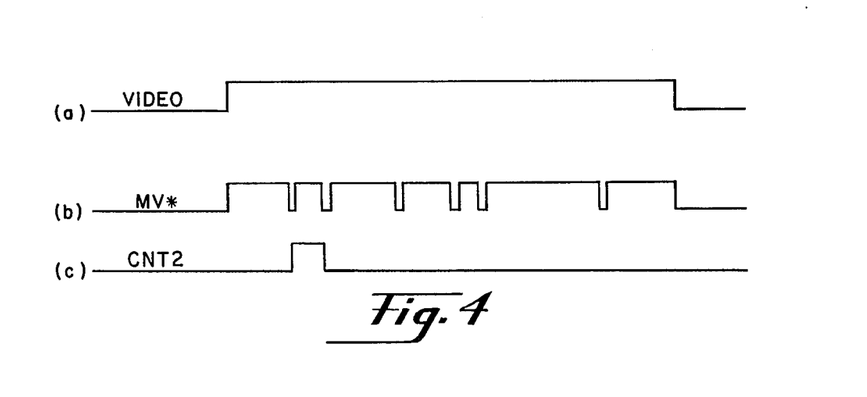
FIG. 4 is a set of graphs showing operation of the phase detection circuit.
Figure 5:
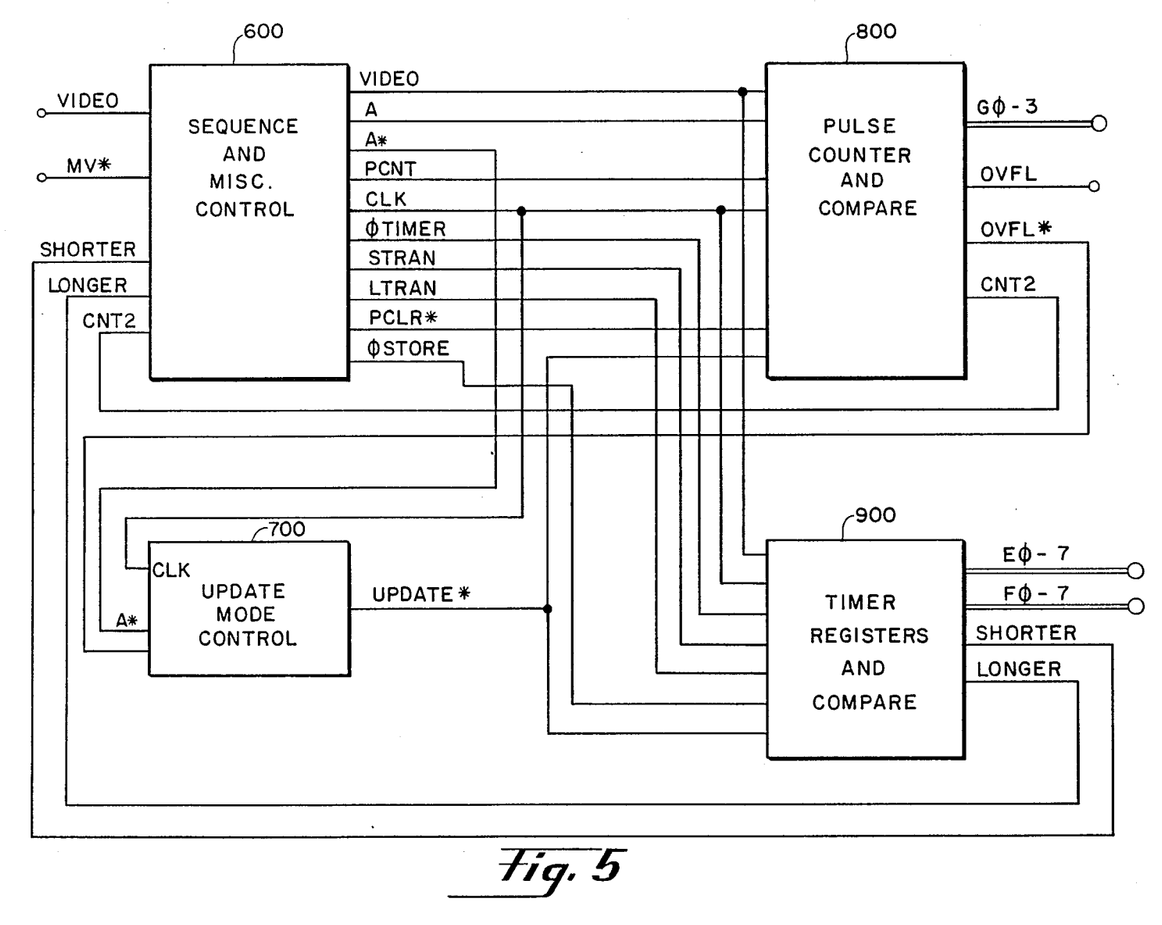
FIG. 5 is a block diagram of an embodiment of the phase detection circuit 300.

III. CIRCUIT TO DETECT THE SPIKES:

There are several ways to detect the spikes to determine if the input is a PSK signal. A simple scheme is presented in FIG. 3, and shown as a block 300 in FIG. 1a. In FIG. 3, there are two inputs: one from the video section of the IFM receiver on line 46; the other one is from one of the differential amplifiers, shown in FIG. 1a as an output on line 48 from the correlator 3n. The video amplifier is used in a receiver to generate the information for measuring pulse amplitude (PA), pulse width (PW) and for initiating the frequency sample window. At a comparator 52, the video signal is compared with a threshold to generate a digital signal on line VIDEO as shown in FIG. 4, graph (a). The leading edge of the digital signal is used to start a synchronized counter, and its trailing edge is used to stop the counter. The synchronized counter comprises a sync. clock 54 and N latches 61-6N. The sin $\omega\tau$(or cos $\omega\tau$) output on line 48 is also compared at a comparator 70 with a fixed threshold, and the output on line MV* is shown in FIG. 4, graph (b). Each phase transition is used to latch all registers which are originally set to zero. If the input signal is a conventional one, the registers will not get latched and their contents will not change. If the input is a PSK signal, each phase transition or spike will sequentially propagate the contents of each register forward and load the contents into the first register. The shortest time between two adjacent registers represents the clock rate of the PSK signal if the PSK signal repeats before the N registers are filled, and the PSK modulating code can be extracted, if desired.

IV. A DETAILED EMBODIMENT OF A DETECTION CIRCUIT:

Another circuit (which has been built and tested) to detect the spikes to determine if the input is a PSK signal, as an embodiment of the phase detection circuit 300 of FIG. 1a, is shown in FIGS. 5-9. As shown in the block diagram of FIG. 5, the detection circuit comprises sequence and miscellaneous control circuits 600 shown in FIG. 6, an update mode control circuit 700 shown in FIG. 7, pulse counter and comparison circuits 800 shown in FIG. 8, and timer registers and comparison circuits shown in FIG. 9. The inputs of the detection circuit are the signals at TTL levels on lines VIDEO and MV*, corresponding to the outputs of the comparators 52 and 70 in FIG. 3. The outputs appear on line OVFL which indicates that a pulse has been declared PSK modulated, on two eight-bit lines E0-7 and F0-7 which digitally code the length of the shortest and the longest PSK pulses, and on a four-bit line G0-3 which digitally codes the total number of pulses between the leading and trailing edges of a signal on line VIDEO. The circuits use the 74S family of logic circuits, in which AND gates are type 74S08, OR gates are type 74S32, inverters are type 74S04, and flip-flops are D type 74S74. Inverted logic lines are indicated by an asterisk (*).

Figure 6:
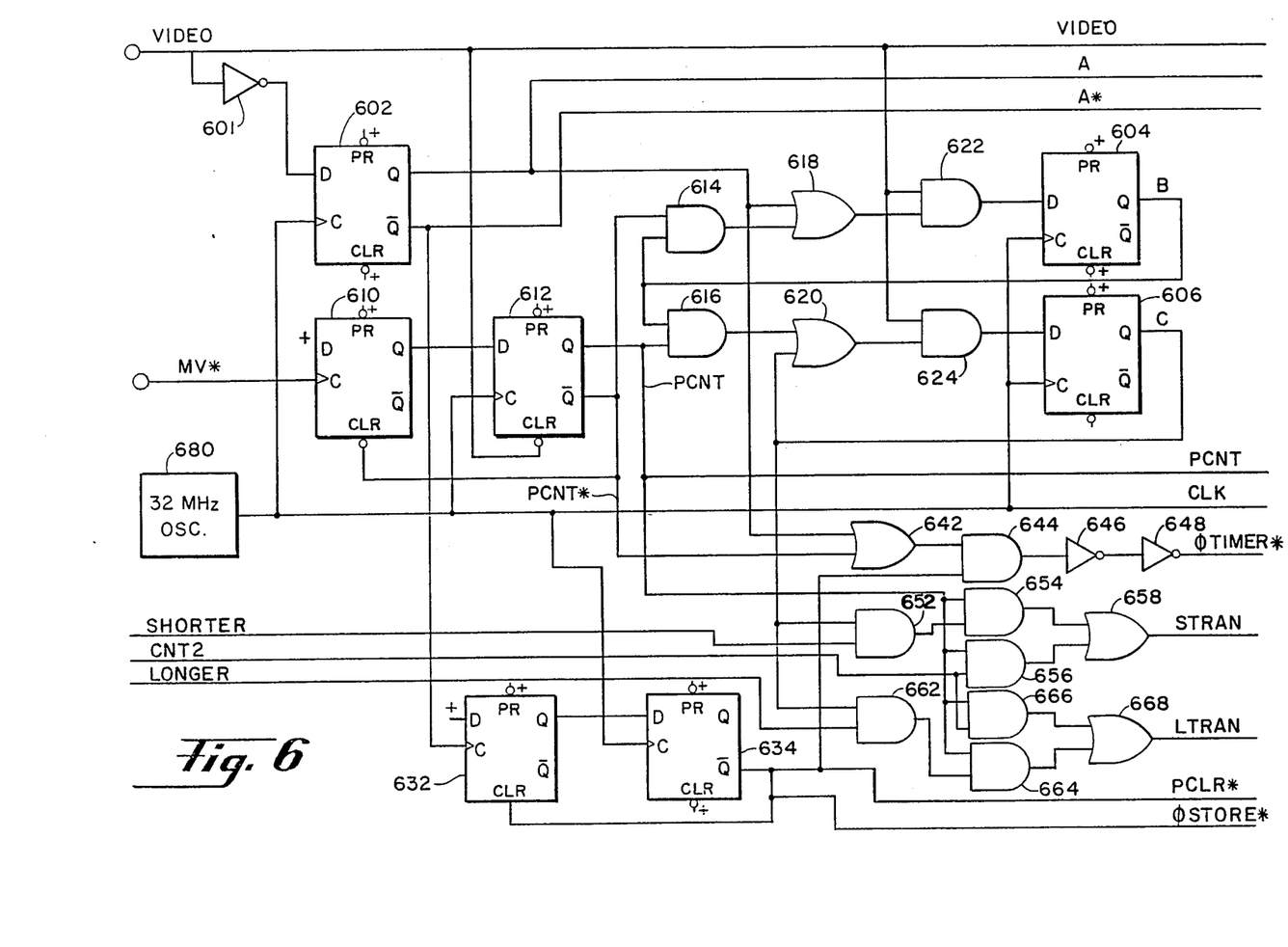
FIGS. 6–9 comprise a functional block diagram of the detection circuit of FIG. 5.

Referring to FIG. 6, a 32-MHz oscillator 680 provides clock pulses on lead CLK. The sequence control circuit comprises three flip-flops 602, 604 & 606, for A, B & C stages respectively. The D input of flip-flop 602 is from the line VIDEO via an inverter 601. The output of flip-flop 602 on lead A is coupled via an OR gate 618 and an AND gate 622 in tandem to the D input of flip-flop 604, with gate 618 having an input from a gate 614, and gate 622 having an input from the input line VIDEO. The output of flip-flop 604 on lead B is coupled via an AND gate 616, an OR gate 620 and an AND gate 624 in tandem to the D input of flip-flop 606, with gate 616 having an input on a lead PCNT, gate 620 having an input on lead C, and gate 624 having an input from the input line VIDEO. The clock inputs of the sequence flip-flops are from lead CLK. The PR and CLR inputs are all connected to +5 volts.

The modulated video signal on line MV* is detected via two flip-flops 610 and 612, with line MV* connected to the clock input of flip-flop 610. The Q output of flip-flop 610 is connected to the D input of flip-flop 612, and the outputs of flip-flop 612 are to leads PCNT and PCNT*, for the pulse count of the spikes which are present for a PSK signal. The clear inputs of the two flip-flops are to lead PCNT* and VIDEO respectively, the D input of flip-flop 610 and both preset inputs are to +5 volts. The clock input of flip-flop 612 is from lead CLK.

A flip-flop 632 has its Q output connected to the D input of a flip-flop 634, with the clock inputs from leads A* and CLK respectively. The Q* output of flip-flop 634 is connected to the clear input of flip-flop 632, to leads PCLR* and 0STORE*, and to an input of an AND gate 644. The D and preset inputs of flip-flop 632, and the preset and clear inputs of flip-flop 634 are to +5 volts.

An OR gate 642 has inputs from leads A and PCNT* and its output to the AND gate 644. The output of gate 644 is coupled via two inverters 646 & 648 which provide a two-gate delay for synchronization to lead 0TIMER*.

An AND gate 652 has inputs from leads SHORTER and C. Lead PCNT goes to inputs of AND gates 654 & 656, which have other inputs from the output of gate 652 and lead CNT2 respectively. The outputs of gates 654 & 656 go to an OR gate 658, whose output is to lead STRAN.

An AND gate 662 has inputs from leads LONGER and C. Lead PCNT goes to inputs of AND gates 664 & 666, which have other inputs from the output of gate 662 and lead CNT2 respectively. The outputs of gates 664 & 666 go to an OR gate 668, whose output is to lead LTRAN.

Figure 7:
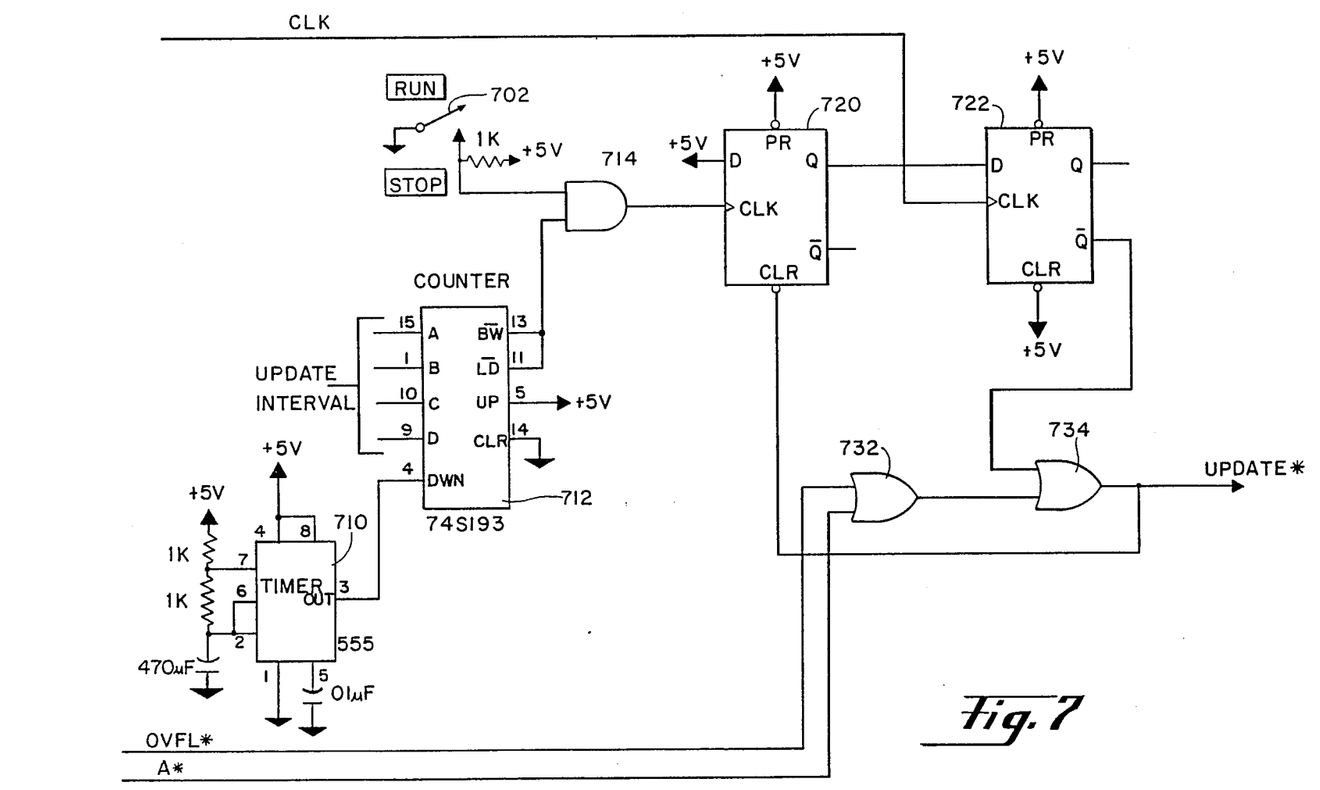

The update mode control circuit shown in FIG. 7 includes a flip-flop 720 having its Q output connected to the D input of a flip-flop 722. A timer 710, IC type 555, is connected as an astable oscillator at a frequency of about one Hertz. Its output goes to the down count input of a synchronous 4-bit up/down counter 712, IC type 74S193. Each of the data inputs A, B, C & D is connected to +5 volts or ground to provide a binary code for an UPDATE INTERVAL. The UP input is at +5 volts, and the clear input at ground. The borrow and load pins are coupled via an AND gate 714 to the clock input of flip-flop 720. A switch 702 connects either ground or +5 volts via a 1K resistor to gate 714, for RUN or STOP respectively. The clock input of flip-flop 722 is from lead CLK. The preset and D inputs of flip-flop 720, and the reset and clear inputs of flip-flop 72 go to +5 volts. Gates 732 and 734 provide a three-input OR function, with inputs from the Q* output of flip-flop 722 and leads OVFL* & A*, and output to lead UPDATE* and the clear input of flip-flop 720.

Figure 8:
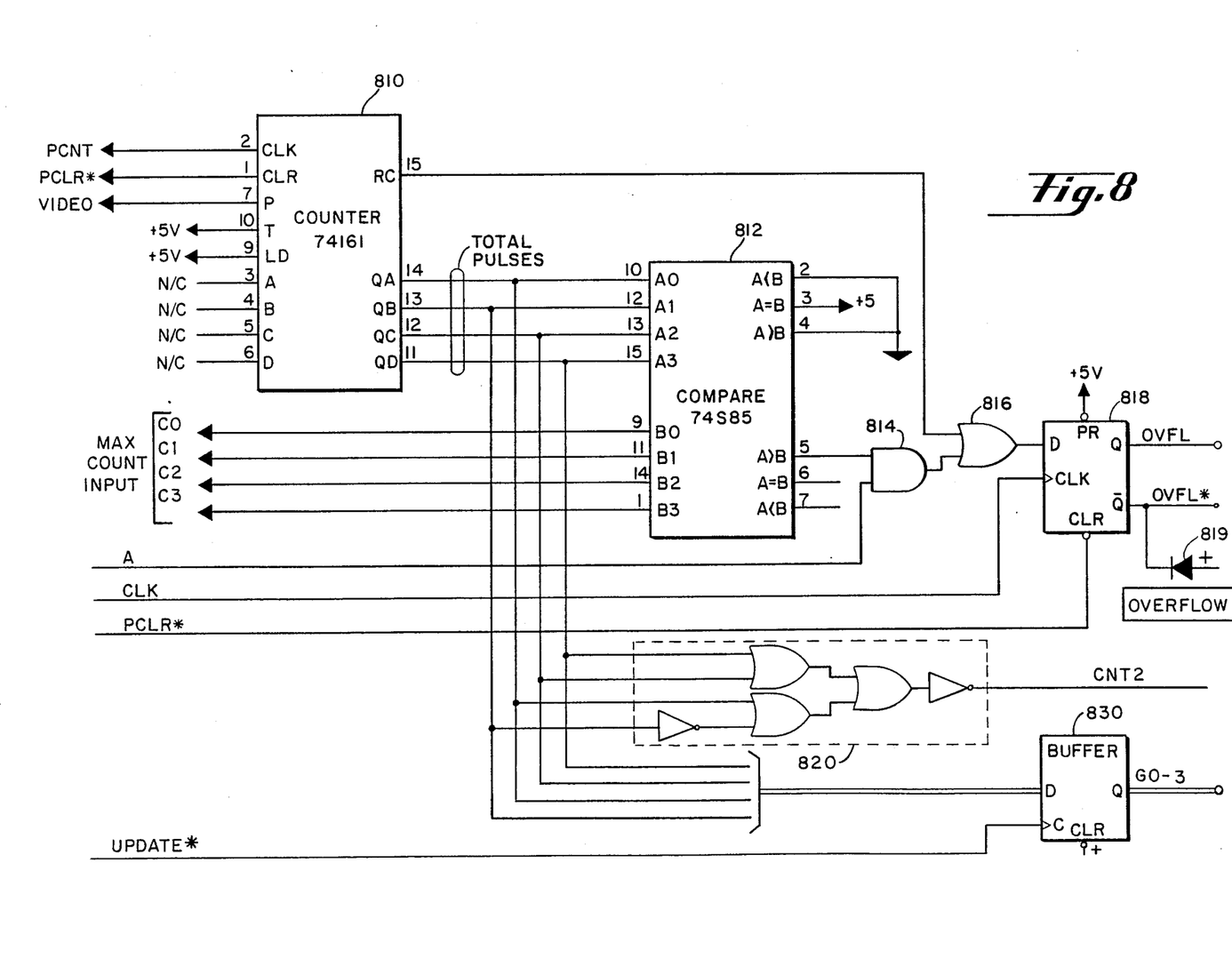

The pulse counter and compare circuit of FIG. 8 comprises a synchronous 4-bit binary counter 810 (IC type 74161), and a 4-bit magnitude comparator 812 (IC type 74S85). The counter 810 has its count enable input P connected to lead VIDEO, its T enable and load inputs to +5 volts, and its clock input to lead PCNT. There is no connection to the data inputs. The 4-bit data output of counter 810, designated TOTAL PULSES, is connected to the A inputs of the comparator 812, to decode logic 820 for lead CNT2, and to the D inputs of a buffer register 830 (IC type 74S175). The B inputs of the comparator 812 are connected to four leads C0-C3, which are binary-coded for a MAX COUNT INPUT. The "A greater than B" output of the comparator 812 is coupled via an AND gate 814 and an OR gate 816 to the D input of a flip-flop 818. Gate 814 has an input on lead A, and gate 816 is an input from the ripple output of the counter 810. Flip-flop 818 has the clock input from lead CLK, the clear input from lead PCLR*, and the preset input at +5 volts. The outputs of flip-flop 818 are to leads OVFL and OVFL*. A light emitting diode 819 is connected to lead OVFL* to provide an OVERFLOW indication. The decode logic 820 provides a signal on lead CNT2 when the 4-bit data output (TOTAL PULSES) of counter 810 has the value "1".

Figure 9:
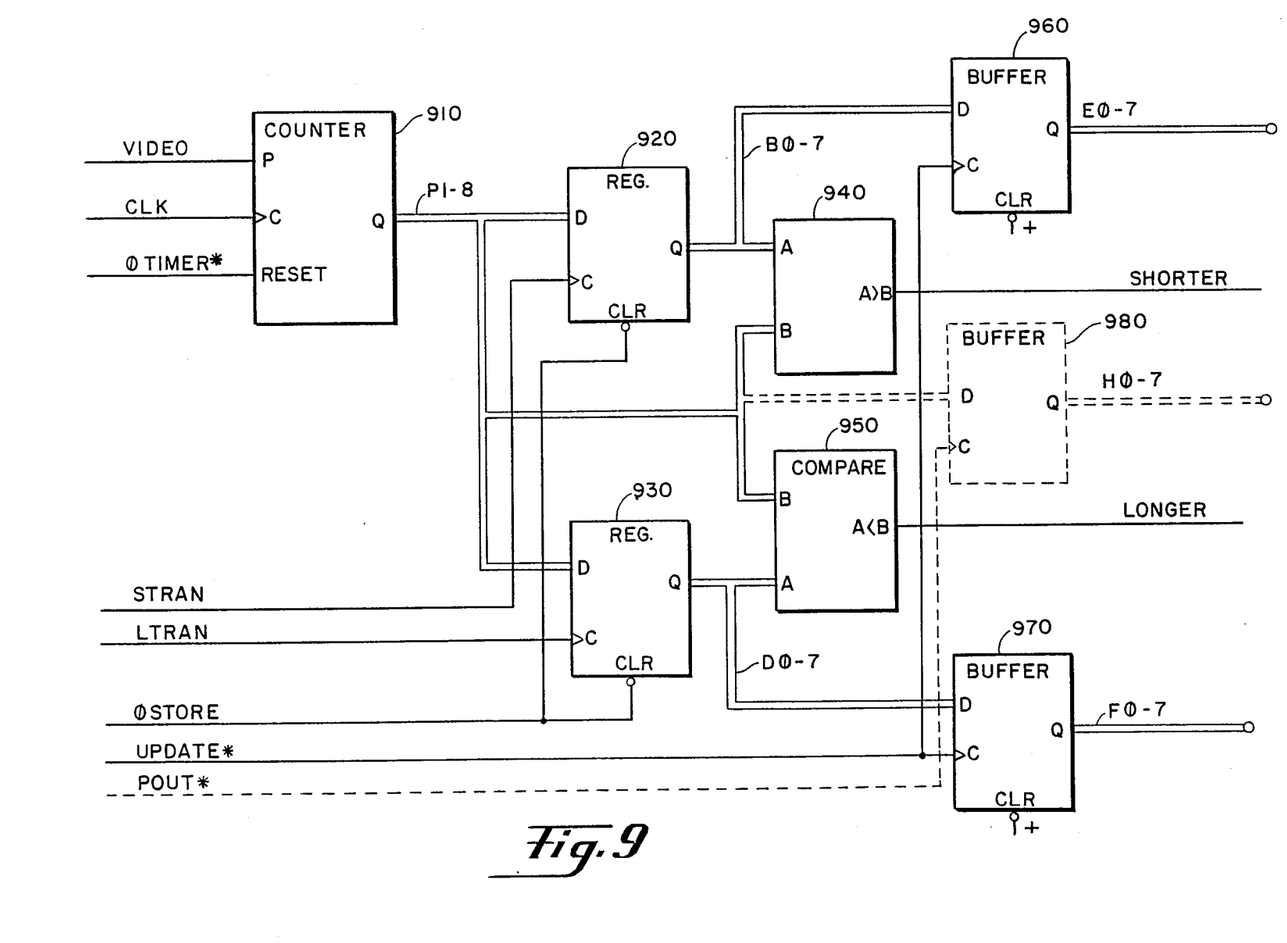

The timer register and compare circuits and output buffers are shown in FIG. 9. The counter 910 comprises two IC units type 74S163, connected to form an 8-bit binary counter, enabled by a high signal on lead VIDEO connected to the P input of the first unit, to count clock pulses on lead CLK. Lead 0TIMER is connected to the LD* input of the first unit and the CLR* input of the second unit for resetting the counter to two. The 8-bit output on line P1-8 indicates pulse length.

There are two timer registers 920 and 930, each of which comprises two IC units type 74S175, to form 8-bit registers having D-type flip-flops. Lead 0STORE is connected to the clear inputs of all four IC units for setting the two registers to zero. The eight D inputs of each of the two registers are connected to respective leads of line P1-8. Lead STRAN is connected to the clock inputs of the register 920, and lead LTRAN is connected to the clock inputs of the register 930, for transferring the contents of counter 910 to register 920 for a short pulse train, and to register 930 for a long pulse train.

Two 8-bit comparators 940 and 950 each comprises two cascaded IC units type 74S85. Each has its eight B inputs connected to respective leads of line P1-8 from the counter 910. The eight A inputs of comparator 940 are connected to the outputs of register 920 on line B0-7, and the "A greater than B" output connected to lead SHORTER. The eight A inputs of comparator 950 are connected to the outputs of register 930 on line D0-7, and the "A less than B" output connected to lead LONGER.

Two output buffer registers 960 and 970 each comprises two IC units type 74S175 to form 8-bit registers, with lead UPDATE* connected to the clock inputs of both registers (and also buffer register 830 in FIG. 8). The eight D inputs of register 960 are connected to line B0-7, and the outputs to an 8-bit line E0-7. The eight D inputs of register 970 are connected to line D0-7, and the outputs to an 8-bit line F0-7.

The OPERATION of the circuit of FIGS. 5-9 starts with the leading edge of the digital signal to start a synchronized counter, and its trailing edge is used to stop the counters.

In an idle state with no pulse being received, the signal on line VIDEO is low. In the sequence circuit of FIG. 6, the flip-flop 602 is set and flip-flops 604 and 606 are reset. Flip-flop 612 is cleared by the low VIDEO signal, which in turn keeps flip-flop 610 cleared. The high signal on lead A via gate 618 provides a high signal to gate 622. Both inputs of gate 624 are low. The signals on lines PCNT, ØTIMER, STRAN and LTRAN are low; and the signals on lines PCLR* and ØSTORE are high.

A waiting state starts when a pulse is detected by the IFM receiver, and the receiving edge of the signal on line VIDEO starts the detection process. The signal from inverter 601 goes low and the output of gate 622 goes high, so that the next clock pulse on line CLK resets the flip-flop 602 and sets the flip-flop 604. Also a pulse on line MV* sets flip-flop 610, making the D input of flip-flop 612 high so that it sets on the next clock pulse, and line PCNT goes high (line PCNT* goes low to clear flip-flop 610). Now both inputs of gate 616 are high, so that via gates 620 and 624 the D input of flip-flop 606 goes high to set it on the next clock pulse. When the flip-flop 602 resets, the positive going signal on line A* sets flip-flop 632, which on the next clock pulse sets flip-flop 634 to produce pulses on lines PCLR* and ØSTORE to clear other circuits. In FIG. 8, the high VIDEO signal enables the pulse counter 810, and the positive going transition on line PCNT advances the count to "1". Flip-flop 612 resets on the next clock pulse. In FIG. 9, the counter 910 is enabled by the high on line VIDEO and starts counting the clock pulses from line CLK.

Each succeeding pulse on line MV* via flip-flop 610 causes flip-flop 612 to set on one clock pulse and reset on the next, producing a pulse on lead PCNT. These pulses are counted by the counter 810. The decode logic 820 produces a signal on line CNT2 during the interval between the first and second MV* spikes as shown by the graph (c) of FIG. 4. The total pulses counted are compared in unit 812 to a preset maximum count input. When this value is exceeded the flip-flop 818 will set to indicate an overflow condition, and the signal is declared modulated. With the signal on line CNT2 high, the pulse on line PCNT via gates 656 and 658 to line STRAN, and via gates 666 and 668 to line LTRAN, clocks the registers 920 and 930 to transfer the contents of counter 910 into both registers. This indicates the length of the interval between the leading edge on line VIDEO and the first pulse being ignored). The signal on line PCNT* via gates 642, 644 and the two inverters to lead ØTIMER* zeros the timer 910 after each interval between pulses.

During succeeding intervals, the contents of the two registers are compared in units 940 and 950 to the contents of the counter 910. When the contents of register 920 are greater than the contents of the counter 910, a signal is generated on line SHORTER, and when the contents of register 930 are less than the contents of the counter 910, a signal is generated on line LONGER. A pulse on line SHORTER via gates 652, 654 and 658 to line STRAN causes the next pulse on line PCNT to transfer the contents from counter 910 to replace the contents of register 920. A pulse on line LONGER via gates 663, 664 and 668 to line LTRAN causes the next pulse on line PCNT to transfer the contents from counter 910 to replace the contents of register 930. Thus the shortest pulse interval is stored in register 910, and the longest pulse interval is stored in register 930.

The circuit in FIG. 7 generates a signal on line UPDATE* to periodically transfer the contents of registers 920, 930 to the output buffers 960 and 970, and the contents of the counter 810 to the buffer 830. For the test purposes, the update takes place every one to fifteen seconds, depending on the input to the counter 712 in FIG. 7. The frequency of the timer 710 could be made much higher as required, or the clock input of flip-flop 720 could be from lead PCNT to update for every video pulse.

Figure 10:
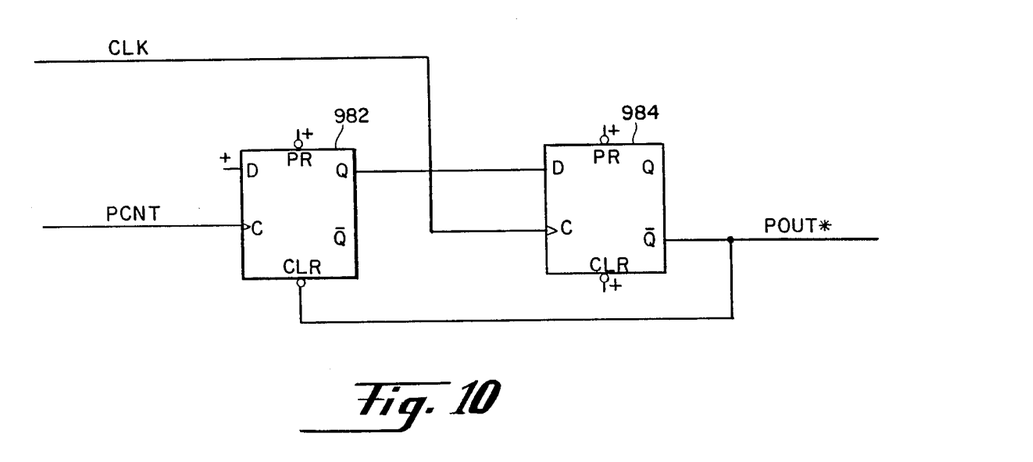
FIG. 10 is a functional block diagram of a clock generator for an optional buffer shown in FIG. 9.

FIG. 9 shows a buffer 980 which could be added to the circuit to register the length of every interval between MV* spikes. The inputs would be from the eight-bit line P1-8, and the clock input from a line POUT*, and the output to an eight-bit line HØ-7. A possible clock generator for this circuit is shown in FIG. 10. It comprises two flip-flops 982 and 984 in tandem, having clock inputs from leads PCNT and CLK respectively. The Q* output of flip-flop 982 is line POUT*, connected to clear flip-flop 730 and to load the buffer 980. The output on line HØ-7 could then be loaded into a fast memory, and would provide the PSK modulation code.

The trailing edge of the signal on line VIDEO resets the circuits to the idle state.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A signal detector for detecting of the presence of long or short pulse PSK signals, and determining a PSK clock rate relating to modulation of said signals, using an instantaneous frequency measurement (IFM) receiver having correlator means in which transient signals occur at a correlator output when a PSK signal is present, and video means producing a digital signal at a video output for the duration of each pulse signal detected by the IFM receiver, said duration being defined from a leading edge to a trailing edge, wherein said signal detector comprises:
  interval timing means having input means coupled to said video output, with means for starting the interval timing means in response to said leading edge and stopping it in response to said trailing edge,
  transient detector means having an input coupled to said correlator output for detecting each of said transient signals to indicate the presence of PSK signals during a pulse signal, and means responsive to detection of a transient signal for indicating a value then present in the interval timing means and starting measurement of a next interval to thereby measure the intervals between transient signals, and means for determining the shortest of said intervals for use in finding said PSK clock rate.

2. A signal detector according to claim 1, wherein said interval timing means comprises clock means producing pulses at a fixed rate and counter means coupled to the clock means for counting the pulses, so that the number of pulses counted is a measure of an interval, and the signal detector further includes means for counting the number of said transient signals occurring during said digital signal and declaring that a pulse is PSK modulated when that number exceeds a preset number, and means for determining the longest of said intervals.

3. A signal detector for detecting of the presence of long or short pulse PSK signals, and determining a PSK clock rate relating to modulation of said signals, using an instantaneous frequency measurement (IFM) receiver having correlator means in which transient signals occur at a correlator output when a PSK signal is present, and video means producing a signal at a video output for the duration of each pulse signal detected by the IFM receiver, the video output being coupled to a video signal line and the correlator output being coupled to a modulated signal line to provide signals at digital levels, said duration being defined from a leading edge to a trailing edge, wherein said signal detector comprises:

clock means providing clock pulses at a fixed rate;

interval timing means comprising first counter means having a clock input coupled to the clock means for counting said clock pulses so that the number of clock pulses counted is a measure of an interval, and having input means coupled to said video signal line for starting the first counter means in response to said leading edge and stopping it in response to said trailing edge, transient detector means having an input coupled to said modulated signal line for detecting each of said transient signals to indicate the presence of PSK signals during a pulse signal, and means responsive to detection of a transient signal for indicating a value then present in the interval timing means and then resetting the second counting means to zero to start measurement of a next interval to thereby measure the intervals between transient signals, and means for determining the shortest of said intervals for use in finding said PSK clock rate.

4. A signal detector according to claim 3, which further includes second counter means for counting the number of said transient signals occurring during said digital signal and declaring that a pulse is PSK modulated when that number exceeds a preset number, and means using said interval timing means for determining the longest of said intervals.

5. A signal detector according to claim 4, wherein the means for determining the shortest of said intervals includes a first register having a set of data inputs coupled to the first counter means, with a clock input from a "short train" signal line for transferring the count as a digital number from the first counter means to the first register, first gate means having inputs from the transient detector means and an output to the "short train"

signal line for enabling said transfer from the first counter means to the first register at the end of the interval between first and second ones of the transient signals, first comparison means coupled to the first counter means and the first register for generating a signal on a "shorter" line in response to the number in the first register being greater than the count in the first counter means, said first gate means also having an input from the "shorter" line for enabling said transfer from the first counter means to the first register;

wherein the means for determining the longest of said intervals includes a second register having a set of data inputs coupled to the first counter means, with a clock input from a "long train" signal line for transferring the count as a digital number from the first counter means to the second register, second gate means having inputs from the transient detector means and an output to the "long train" signal line for enabling said transfer from the first counter means to the second register at the end of the interval between first and second ones of the transient signals, second comparison means coupled to the first counter means and the second register for generating a signal on a "longer" line in response to the number in the first register being less than the count in the first counter means, said second gate means also having an input from the "longer" line for enabling said transfer from the first counter means to the second register.

* * * * *

UNITED STATES PATENT OFFICE
CERTIFICATE OF CORRECTION

Patent No. 4,860,318                     Dated  August 22, 1989

Inventor(s) Rudy L. Shaw et al

It is certified that error appears in the above-identified patent and that said Letters Patent is hereby corrected as shown below:

In the abstract, line 4, "signal" should be "signals".
In the abstract, line 11, "a" should be "and".
Col 2, line 38, "used" should be "uses".
Col 5, line 67, "72" should be "722".
Col 7, line 16, "receiving" should be "rising".
Col 7, line 52, after "between the" should be "first and second
      pulses on line MV* (the interval between the".
Col 8, line 24, "730" should be "982".
Col. 8, line 23, "982" should read --732--

Signed and Sealed this

Twenty-ninth Day of January, 1991

Attest:

HARRY F. MANBECK, JR.

*Attesting Officer*     *Commissioner of Patents and Trademarks*